Nov. 11, 1952  D. PERKELL ET AL  2,617,195
CENTRIC-ARTICULATOR
Filed Jan. 30, 1950

INVENTORS
DAVID PERKELL AND
SAMUEL PERKELL
BY
Thomas M. Ferrill, Jr.
ATTORNEY

Patented Nov. 11, 1952

2,617,195

UNITED STATES PATENT OFFICE 2,617,195

CENTRIC-ARTICULATOR

David Perkell, Malverne, and Samuel Perkell, Lynbrook, N. Y.

Application January 30, 1950, Serial No. 141,267

8 Claims. (Cl. 32—32)

The present invention relates to dental test apparatus and methods, and is particularly concerned with the provision of improved apparatus for thorough testing of dentures and castings of natural teeth.

Articulator units have heretofore been provided for receiving cast impressions of upper and lower dentures and enabling the dental technician to make a test by carrying out a predetermined pattern of relative motions therebetween.

One type of prior device has provided for hinged movement of the upper denture casting about a fixed axis at the rear of the apparatus. It is generally recognized, however, that this is inadequate, in that the human jaw motions are not properly simulated by mere hinging action about a fixed axis.

Another type of prior device has provided for a modification of hinged movement, allowing for limited lateral movement and some upward travel along a plurality of cam surfaces. This unit, however, has not proven adequate for full testing of the denture castings, since it does not yield the technician full proof of the suitability of the dentures for the various kinds of biting and chewing jaw motions utilized by human beings.

The object of the present invention is to provide an apparatus for and method of more completely and reliably and efficiently testing dentures and castings, enabling the operator to investigate more fully and readily the extent to which the dentures are suited to each other and able to serve their purpose in the mouth of the patient.

Another important object is to provide for testing in plural test modes without requirement of demounting the dentures or replicas and transfer of them from one test apparatus to another.

These objectives are met in the present invention by the provision of a single test apparatus which provides full mounting for the lower and upper plate castings, and which provides for properly controlled hinge and lateral movement of the upper denture or casting relative to the lower casting (articulation) and in addition provides for straight vertical movement (centric-articulation) of the upper denture casting relative to the lower denture or casting. The latter mode of test movements is accomplished with the retention of fully controlled alignment of the upper and lower dentures or castings in such a way that impressions may be taken which supplement the articulation impressions to show whether the dentures are so mated to each other as to be ideally suitable for the varied jaw motions of the human user.

Figure 1:
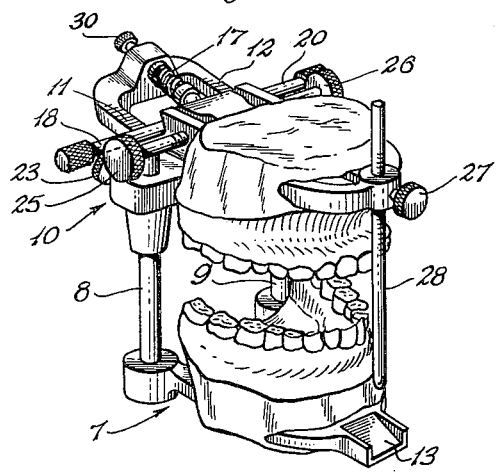
Fig. 1 shows one embodiment of the invention.

In Fig. 1 the base is a bronze casting having three footed sections—two at the rear and one at the front. A pair of upright columns 8 and 9 are rigidly secured in the rear footed sections. These columns 8 and 9 are machined for uniformity of diameter and perfect parallel alignment.

The front footed extremity of the base 7 is provided with an inclined ramp 13 to form a rest and guiding surface for lateral articulative movement of the "upper jaw" portion of the apparatus, to be described presently.

The base 7 is skeletonized in its intermediate region, to receive the lower denture or replica casting thereof, as illustrated in Fig. 1.

A cast body 10 is provided with massive sides bored to conform to the columns 8 and 9, so that the body 10 can ride up and down on these columns freely but is constrained in accurate alignment with the base 7. The body 10 includes a U-shaped rearwardly extending yoke having parallel arms inclined upward at an angle of elevation of approximately 20°. These parallel arms include smooth upper surfaces 11 and 12 which serve as tracks for outwardly extending rod parts of the third major casting—the "hinge" unit 6.

A boss is formed on the rearmost extremity of the body 10, and is bored to receive a spring guide rod 30 carrying a compressed helical spring 17.

A pair of upwardly-extending webs 14 and 16 are provided on body 10 for generally locating the rearmost portion of the hinge unit 6.

The hinge unit 6 includes a massive rear block section bored to receive a single cross rod or a pair of aligned rods 18 and 20 which serve as the hinge pin for the junction between unit 6 and body 10. A boss is formed on the front of hinge unit 6 and bored vertically to receive a calibrated rod 28 which is arranged to have its lower end ride on ramp 13 for lateral articulative movement. The intermediate region of hinge unit 6 is of open-work form similar to the corresponding part of the base 7, for receiving the upper denture or replica casting.

The vertically movable upper assembly of the centric-articulator is arranged with the massive rear block section of the hinge 6 situated between webs 14 and 16 of body 10, and with the hinge pin or outwardly extending rod or rods 18, 20 resting on inclined tracks 11 and 12. The compressed spring 17 on spring guide rod 30 provides pressure on the rear surface of the rear block end of hinge unit 6, directed approximately parallel to tracks 11 and 12. The rounded head of the spring guide pin 30 presses against the upper area of the curved back surface of this rear block end, acting to hold it down onto tracks 11 and 12 as well as to urge it forward.

The rear ends of webs 14 and 16 preferably are made in concave form for cooperating with the hinge pin 18, 20 and the spring and guide rod 17, 30 to locate the hinge 6 and the denture or replica carried thereby.

A pair of thumb screws 23 are provided in the outer extremities of body 10 to provide for clamping this body at a desired height on columns 8 and 9.

A pair of thumbscrews 25 and 26 are provided in webs 14 and 16 to enable the user to clamp the hinge unit 6 rigidly to the body 10. Yet another thumbscrew 27 is provided in the front boss of hinge unit 6 for enabling the user to set the rod 28 at a desired positional relation in unit 6.

In the use of this apparatus, the lower and upper dentures or replicas are solidly attached to or cast on the base 7 and the hinge unit 6, as shown in Fig. 1, in such a way that maximum initial contact and register of the irregular top surfaces of the "teeth" is provided with the hinge unit 6 substantially horizontal. With all five of the thumbscrews 23, 25, 26 and 27 retracted, the upper assembly of body 10 and hinge unit 6 is lowered to the position with the "teeth" in contact. Now, either of the two types of tests may be accomplished, as follows: For lateral articulative testing, thumbscrews 23 are run in firmly against columns 8 and 9, and screws 25 and 26 are retained in their retracted positions. Frontal rod 28 is lowered into the position with its lower end on ramp 13, and thumbscrew 27 is run in to hold the rod 28 firmly fixed in hinge unit 6. Now, chewing motion is simulated by moving the hinge unit laterally, with the appropriate small components of vertical movement being supplied through the inclination of ramp 13 on which rod 28 rides and of tracks 11 and 12 on which hinge pin projections 18 and 20 ride, one at a time, as the upper "jaw" is moved from side to side.

Impression paper is placed between the "lower jaw teeth" and the "upper jaw teeth," and marks are made on the "high spots" detected by the "chewing motion" as thus provided. In this way, progressive tests and grinding operations are carried out to bring the tooth configurations toward proper conformity, with insurance of the proper cusp angles for most comfortable and effective chewing action of the patient.

The other mode of testing, which is termed "centric-articulation," is accomplished with direct vertical motion of the upper assembly. For this test, returning to the condition with the upper jaw replica at full rest on the lower jaw replica, thumbscrews 25 and 26 are run up to lock the hinge unit 6 rigidly in place in the body 10. Thumbscrew 27 is retracted, and rod 28 is raised to a high position and rechucked by running up the thumbscrew 27. Now, with the posterior thumbscrews 23 retracted, the assembly including body 10 and hinge unit 6 is moved upward and downward, providing accurately simulated "biting" action. Impression paper is used in this test just as in the "chewing" test, for further checking the evenness of the "bite" action.

The centric-articulative tests and the lateral-articulative tests may be made alternately, to achieve high efficiency in bringing the castings or dentures to the optimum conformations. Throughout these tests, the same apparatus including major parts 6, 7 and 10 is employed, affording maximum facility and insuring that the compatibility of the jaw portions for each other is fully established with advantageous reduction of reliance upon the patient's mouth as a proving-ground.

Figure 2:
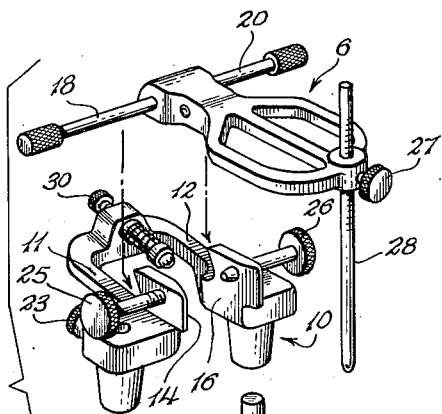
Fig. 2 shows the base, body and hinge portions separated, for fuller understanding of the manner in which these parts are arranged to cooperate in the complete centric-articulator.
Figure 3:
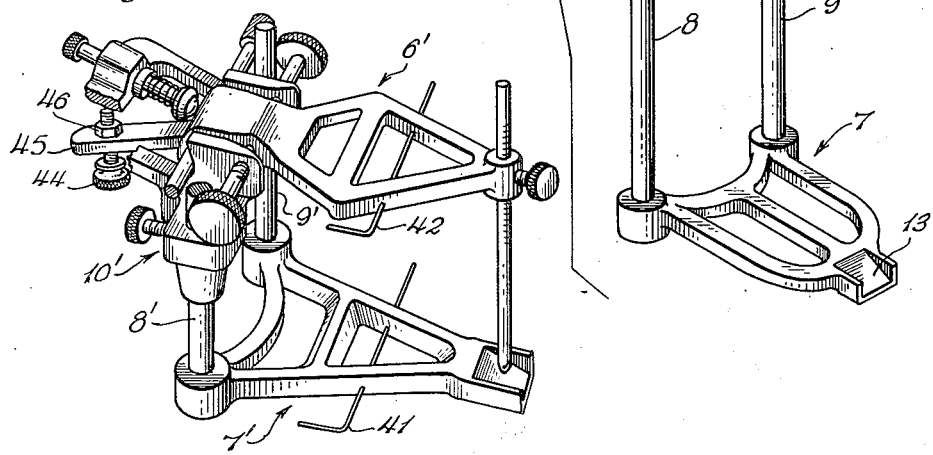
Fig. 3 is a modified version of the invention including two additional features.

In the embodiment of the invention shown in Fig. 3, the major parts 7', 10' and 6' correspond to the major parts 7, 10 and 6 of the embodiment of Figs. 1 and 2. One added feature in Fig. 3 is the modification of the cross-sectional shape of the open-work in the base 7' and the hinge unit 6', designed so that a casting formed on one of these units may be removed and re-seated in its former position. Pins 41 and 42 are provided in suitable transverse drilled passages in the base 7' and hinge unit 6', for locking the denture casting in place. These pins are in position in their drilled passages when the castings are formed, and are removed first to allow the castings to be lifted off. After re-seating of the castings, the pins are restored to lock the castings securely in place.

The other feature added in Fig. 3 is a rearward lug-extension 44 as an integral part of the cast body 10', with a thumbscrew 45 threadedly inserted therein and arranged to be run up against the lower surface of the yoke of the body 10', when the dentures or castings are at rest in maximum contact. A nut 46 is then tightened on screw 45 against the lug-extension 44, to fix the screw 45 in this position. The purpose of screw 45 is to add reinforcement when the hinge 6' is rigidly clamped in body 10' for centric-articulation, a reinforcement gained with its leverage as it bears against the yoke. It is so positioned as not to interfere in the articulative testing, since it just touches the lower surface of the yoke as the hinge unit 6' passes through its neutral position in this mode of movement and clears it at all other times. Thus, once positioned for a given set of dental castings, the screw system 45, 46 remains fixed throughout all the tests.

Figure 4:
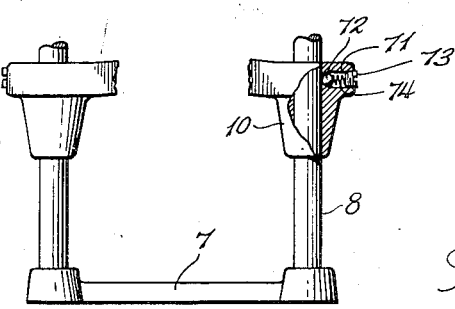
Fig. 4 is a view of a spring-restraint modification to insure tightness at all times between the upright columns and the body portion.

Fig. 4 shows a modification applicable to the embodiment of Figs. 1 and 2 or the embodiment of Fig. 3, for providing preadjusted frictional loading of the body 10 or 10' against the vertical columns. For this purpose, a transverse passage 71 is drilled through the body into each vertical bore therethrough, being tapered as shown at the junction with the vertical bore. A hardened steel ball 72 is provided therein, of a diameter just large enough to prevent it from being able to pass from the transverse passage into the vertical bore.

The outer part of the passage is threaded to receive a screw-cap 73, and a compressed spring 74 is provided in the passage between the screw-cap for urging the ball against the vertical column in the bore of the body.

With this arrangement, spring loading is provided, keeping the body tightly positioned on the vertical columns, and supplementing the accurate matching of diameters of the bores with the vertical columns in insuring fixed alignment between the body and the base of the unit. This fixed alignment and the attendant fixed smooth loading of the body in its vertical movement are both of advantage during the centric-articulation tests.

It will be apparent that the locking screws 23 may be arranged to be run in from the sides of the body instead of the rear thereof, and the passages for the spring load-and-ball units may be drilled in from the rear of the body.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Dental test apparatus comprising a base including means for receiving a first denture or replica thereof, a body portion, means rigidly fixed to said base and slidably coacting with said body portion to guide said body portion in vertical movement relative to said base and to constrain it against rotation and lateral movement, and hinge means coacting with said body portion for receiving a second denture or replica thereof, said body portion including means for selectively clamping said hinge means rigidly therein for vertical movement of said second denture or replica along with said body portion and for selectively allowing said hinge means to hinge upward relative thereto and to be moved laterally along predetermined lines of constraint thereon.

2. Dental test apparatus as defined in claim 1, wherein said base includes a frontal inclined surface section forward of the position in which the first denture or replica is received, and said hinge means includes a rod extending substantially vertically downward to rest on said inclined surface and arranged to be clamped at the height corresponding to the normal position of rest of said dentures or replicas.

3. Dental test apparatus comprising a base including means for receiving a lower denture casting, a pair of upright parallel columns rigidly secured in said base, a vertically movable body member having a pair of parallel bores therethrough conformal to the surfaces of said upright columns, said body member including means for clamping it to said columns at any selected height, said body member further including a yoke portion having a pair of parallel sections extending upwardly and rearwardly from said columns, a hinge unit for receiving an upper denture casting, said hinge unit including a hinge pin extending transversely thereof, said hinge pin resting on said parallel sections, said body member further including a pair of webs receiving the rearmost end of said hinge unit therebetween, and also including compressed spring means for urging said hinge unit forward and said hinge pin downward to the limit of its freedom.

4. Dental test apparatus as defined in claim 3, wherein said body member includes means for selectively clamping said hinge unit rigidly thereto, and for selectively releasing said hinge unit and allowing it to be moved against the yielding of said spring means.

5. Dental test apparatus as defined in claim 4, wherein said means for selectively clamping said hinge unit comprises a pair of aligned thumbscrews in threaded holes through said webs to be run in to clamp said hinge unit and to be run out to permit limited movement thereof within the confines of the space between said webs.

6. Dental apparatus for use in determining the adaptability of dentures, comprising a base of generally triangular form, a pair of upright columns at each of two rear corners of said base, an inclined ramp at the front corner of said base, and said base including means intermediate the rear base line of said two columns and the ramp for receiving and rigidly holding a lower denture or replica thereof, means riding on said columns for receiving and rigidly holding an upper denture or replica thereof, and means for selectively locking said upper denture holding means against angular movement, said upper denture receiving means being selectively movable vertically as a unit with said upper denture or replica in fixed lateral and rotational alignment above said lower denture or replica, and being selectively adapted to be fixed in its height on said columns and to allow limited freedom of predetermined lateral and hinging movement of said upper denture or replica about said lower denture or replica, said upper denture receiving means including a downwardly projecting portion movable on said ramp for guiding said lateral and hinging movement.

7. Dental apparatus as defined in claim 6, wherein said means riding on said columns for receiving said upper denture or replica thereof comprises a body having parallel bores therein conformal to said upright columns, hinge means cooperating with said body and including a region to which said upper denture or replica is to be affixed, said body including parallel inclined tracks extending rearwardly and upwardly from points adjacent said bores, said hinge means including rod-like lateral projections riding on said parallel inclined tracks, and also including an adjustable frontal vertical rod extending downwardly to rest on said ramp, said selective locking means comprising means on said body for selectively clamping said hinge means rigidly thereon and for selectively allowing said hinge means restricted freedom of lateral and oscillator movement relative thereto with said rod-like lateral projections vertically guided on said tracks and said frontal vertical rod vertically guided on said ramp, and spring means acting between said body and said hinge means to urge said hinge means forward and downward and to provide elastic restraint of its freedom.

8. Dental apparatus as defined in claim 7, wherein said body includes means for selectively clamping to said columns at a predetermined height thereon and for selectively riding upwardly and downwardly thereon, and said hinge means receives said frontal vertical rod in an adjustable slip connection, said frontal vertical rod being calibrated to indicate the dimensions of corrections to be made in said dentures or replicas.

DAVID PERKELL.
SAMUEL PERKELL.

REFERENCES CITED

The following references are of record in the file of this patent:

UNITED STATES PATENTS

| Number | Name | Date |
|---|---|---|
| 547,195 | Antes | Oct. 1, 1895 |
| 1,654,453 | Brown | Dec. 27, 1927 |
| 1,668,845 | Hanau | May 8, 1928 |
| 2,130,083 | Franwick | Sept. 13, 1938 |